US012673670B2

(12) United States Patent
Li et al.

(10) Patent No.: US 12,673,670 B2
(45) Date of Patent: Jul. 7, 2026

(54) VEHICLE CONTROL GOVERNOR

(71) Applicant: Ford Global Technologies, LLC, Dearborn, MI (US)

(72) Inventors: Yutong Li, Novi, MI (US); Nan Li, Auburn, AL (US); Kenneth Topolovec, Canton, MI (US); Ilya Kolmanovsky, Novi, MI (US); Hongtei Tseng, Canton, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 18/631,622

(22) Filed: Apr. 10, 2024

(65) Prior Publication Data

US 2025/0319863 A1      Oct. 16, 2025

(51) Int. Cl.
*B60W 30/09* (2012.01)
*B60W 10/18* (2012.01)
*B60W 10/20* (2006.01)
*B60W 30/095* (2012.01)

(52) U.S. Cl.
CPC ............ *B60W 30/09* (2013.01); *B60W 10/18* (2013.01); *B60W 10/20* (2013.01); *B60W 30/0956* (2013.01); *B60W 2520/10* (2013.01); *B60W 2710/18* (2013.01); *B60W 2710/20* (2013.01)

(58) Field of Classification Search
CPC ...... B60W 30/09; B60W 10/18; B60W 10/20; B60W 30/0956; B60W 2520/10; B60W 2710/18; B60W 2710/20; G08G 1/163; G08G 1/0967; G08G 1/00; B60T 8/1755; B60L 7/18; B62D 1/00; B62D 15/00; B60K 2031/0033

USPC .......................................................... 701/301
See application file for complete search history.

(56) References Cited

U.S. PATENT DOCUMENTS

| | | | |
|---|---|---|---|
| 11,537,139 B2 | 12/2022 | Rankawat et al. | |
| 11,891,035 B2 * | 2/2024 | Yang ..................... | B60W 30/09 |
| 12,296,857 B2 * | 5/2025 | Afshar ........... | B60W 60/00272 |
| 2005/0225477 A1 * | 10/2005 | Cong ................. | B60K 31/0066 |
| | | | 342/72 |

(Continued)

FOREIGN PATENT DOCUMENTS

| | | | | |
|---|---|---|---|---|
| EP | 3772707 A1 * | 2/2021 | ............. | G06N 3/045 |
| WO | WO-2018057455 A1 * | 3/2018 | ............. | G08G 1/166 |

OTHER PUBLICATIONS

Maciej et al., "Modular Kinematic Modelling of Articulated Buses," 2020, vol. 69, Publisher: IEEE.*

(Continued)

*Primary Examiner* — Tuan C To
(74) *Attorney, Agent, or Firm* — Frank A. MacKenzie; Brooks Kushman P.C.

(57) ABSTRACT

A computer includes a processor and a memory, and the memory stores instructions executable by the processor to determine an adjusted control input for a component of a host vehicle that maximizes a number of timesteps for which a constraint on a host kinematic state of the host vehicle and a target kinematic state of at least one target vehicle is satisfiable; and actuate the component according to the adjusted control input. The determination of the adjusted control input is based on a nominal control input, the host kinematic state, and the target kinematic state.

20 Claims, 4 Drawing Sheets

(56)     References Cited

U.S. PATENT DOCUMENTS

| | | | |
|---|---|---|---|
| 2021/0114625 A1* | 4/2021 | Liu | B60W 60/0015 |
| 2022/0250612 A1* | 8/2022 | Wang | G06V 20/58 |
| 2023/0020503 A1 | 1/2023 | Rahman et al. | |
| 2023/0047354 A1 | 2/2023 | Wang et al. | |
| 2024/0272636 A1* | 8/2024 | Black | B60W 60/0015 |
| 2025/0044106 A1* | 2/2025 | Huynh | B60W 30/18154 |
| 2025/0121849 A1* | 4/2025 | Black | B60W 60/001 |

OTHER PUBLICATIONS

Tearle, B., et al., "A predictive safety filter for learning-based racing control," arXiv:2102.11907v1 [eess.SY] Feb. 23, 2021, 8 pages.

\* cited by examiner

VEHICLE CONTROL GOVERNOR

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems.

DETAILED DESCRIPTION

Figure 1:
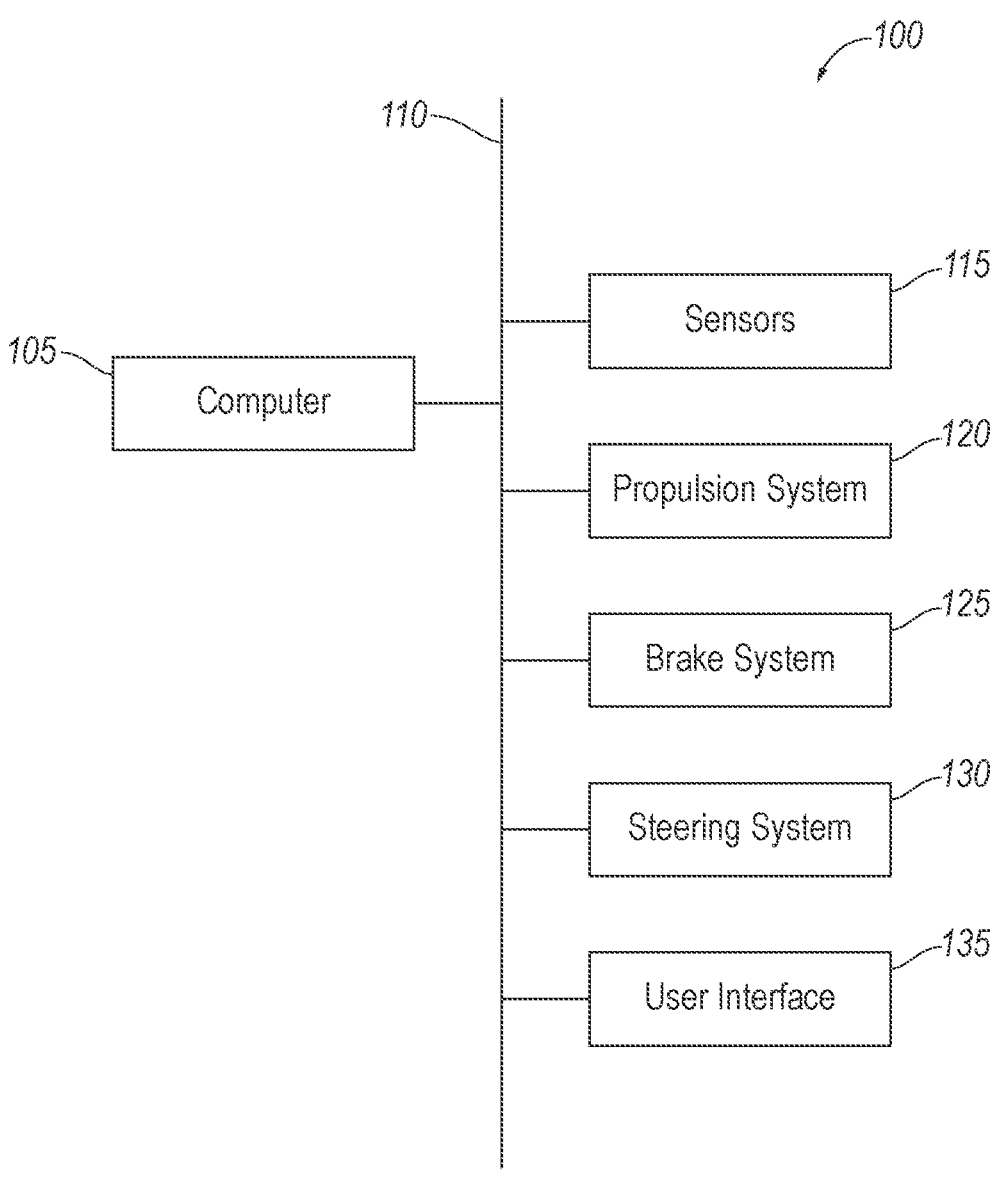
FIG. 1 is a block diagram of an example host vehicle.

The techniques described herein may prevent or delay contact between a host vehicle and a target vehicle in certain scenarios in a robust manner by actuating a component of the host vehicle, e.g., autonomous operation or ADAS functions. The techniques herein may be added to an existing algorithm for controlling the host vehicle such as reference governor (RG), control barrier function (CBF), model predictive control (MPC), action governor (AG), or responsibility sensitive safety model (RSS). Any of these algorithms on a computer of the host vehicle may output a nominal control input for the component, e.g., a braking force for a brake system, a steering angle for a steering system, etc. The computer of the host vehicle may then determine an adjusted control input for the component based on the nominal control input, a host kinematic state of the host vehicle, and a target kinematic state of the target vehicle. A "kinematic state" is a description of the position and/or motion of an entity. The computer then actuates the component according to the adjusted control input.

The computer determines an adjusted control input that maximizes a number of timesteps for which a constraint on the host kinematic state and target kinematic state is satisfiable. For example, in the context of an adaptive cruise control, the constraint may be that a longitudinal distance from the host vehicle to the target vehicle is greater than a preset minimum distance. The constraint being "satisfiable" at a future timestep means that control inputs will be available to the host vehicle that will satisfy the constraint, e.g., maintain the minimum distance, at the timesteps up to that future timestep. In most instances, the nominal control input will make the constraint satisfiable for an indefinite number of timesteps, so the adjusted control input will equal the nominal control input. Occasionally, the constraint will not be satisfiable for an indefinite number of timesteps, e.g., as a result of extreme changes to the target kinematic state. In such instances, the computer determines the adjusted control input that will maximize the finite number of timesteps for which the constraint is satisfiable, rather than optimizing some present kinematic quantity as done by other control algorithms. Using the number of timesteps as the target for optimization may provide the host vehicle with more opportunity to prevent contact with the target vehicle in certain scenarios by providing more time for the situation to change. Moreover, using the number of timesteps can help provide appropriate control in a more provable manner, which is not provided by adding slack variables in the constraints as in CBF or MPC.

A computer includes a processor and a memory, and the memory stores instructions executable by the processor to determine an adjusted control input for a component of a host vehicle that maximizes a number of timesteps for which a constraint on a host kinematic state of the host vehicle and a target kinematic state of at least one target vehicle is satisfiable; and actuate the component according to the adjusted control input. The determination of the adjusted control input is based on a nominal control input, the host kinematic state, and the target kinematic state.

In an example, the instructions may further include instructions to output the number of timesteps for which the constraint is satisfied.

In an example, the instructions may further include instructions to recursively determine for each timestep a set of possible host kinematic states at that timestep for which the constraint is satisfied at that timestep, the set of possible host kinematic states at the timestep being a subset of a set of possible host kinematic states at an immediately previous timestep. In a further example, the instructions may further include instructions to perform the recursive determination of the set of possible host kinematic states until a timestep at which the set of possible host kinematic states is empty.

In another further example, the instructions may further include instructions to determine the set of possible host kinematic states at each timestep such that a possible control input exists for which the set of possible host kinematic states at the timestep is a subset of the set of possible host kinematic states at the immediately previous timestep.

In another further example, the instructions may further include instructions to determine the possible host kinematic states at each timestep using a system dynamics model taking as inputs the adjusted control input, host kinematic state, and target kinematic state at the immediately previous timestep.

In an example, the adjusted control input may be a second adjusted control input, and the instructions may further include instructions to determine whether a first adjusted control input exists for which the constraint is satisfiable for an indefinite number of timesteps, and, in response to the first adjusted control input not existing, determine the second adjusted control input. In a further example, the instructions may further include instructions to actuate the component according to the first adjusted control input in response to the first adjusted control input existing, and actuate the component according to the second adjusted control input in response to the first adjusted control input not existing.

In another further example, the instructions may further include instructions to determine the first adjusted control input that minimizes an objective function of the host vehicle.

In another further example, the instructions may further include instructions to set the first adjusted control input to the nominal control input in response to the constraint being satisfiable for an indefinite number of timesteps by the nominal control input.

In another further example, the instructions may further include instructions to determine whether the first adjusted control input exists for which the host kinematic state is in a set of host kinematic states satisfying the constraint, and the set of host kinematic states may be a control invariant set.

In an example, the instructions may further include instructions to determine the adjusted control input that maximizes the number of timesteps for which the constraint on the host kinematic state and target kinematic state is satisfiable across a range of target kinematic states. In a further example, the range may be a predetermined range.

In another further example, the instructions may further include instructions to determine possible host kinematic states at each timestep using a system dynamics model taking as inputs a control input at the immediately previous timestep, the host kinematic state at the immediately previous timestep, and the range of target kinematic states.

In an example, the adjusted control input may be a command for at least one of a propulsion system, brake system, or steering system of the host vehicle.

In an example, the instructions may further include instructions to determine the nominal control input based on the host kinematic state and the target kinematic state.

In an example, the instructions may further include instructions to receive the nominal control input from an operator of the host vehicle.

In an example, the host kinematic state may include a velocity of the host vehicle.

In an example, the target kinematic state may include at least one velocity of the at least one target vehicle.

A method includes determining an adjusted control input for a component of a host vehicle that maximizes a number of timesteps for which a constraint on a host kinematic state of the host vehicle and a target kinematic state of at least one target vehicle is satisfiable; and actuating the component according to the adjusted control input. The determination of the adjusted control input is based on a nominal control input, the host kinematic state, and the target kinematic state.

With reference to the Figures, wherein like numerals indicate like parts throughout the several views, a computer 105 includes a processor and a memory, and the memory stores instructions executable by the processor to determine an adjusted control input for a component of a host vehicle 100 that maximizes a number of timesteps for which a constraint on a host kinematic state of the host vehicle 100 and a target kinematic state of at least one target vehicle 200 is satisfiable; and actuate the component, e.g., control or operate the host vehicle 100, according to the adjusted control input. The determination of the adjusted control input is based on a nominal control input, the host kinematic state, and the target kinematic state.

With reference to FIG. 1, the host vehicle 100 may be any passenger or commercial automobile such as a car, a truck, a sport utility vehicle, a crossover, a van, a minivan, a taxi, a bus, etc. The host vehicle 100 includes the computer 105, a communications network 110, sensors 115, a propulsion system 120, a brake system 125, a steering system 130, and a user interface 135.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided premanufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together. Alternatively, the computer 105 may include a computer remote from the host vehicle 100, with which the computer 105 on board the host vehicle 100 is in communication.

The computer 105 may transmit and receive data through the communications network 110. The communications network 110 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the sensors 115, the propulsion system 120, the brake system 125, the steering system 130, the user interface 135, and other components via the communications network 110.

The sensors 115 may provide data about operation of the host vehicle 100, for example, wheel speed, wheel orientation, and engine and transmission data (e.g., temperature, fuel consumption, etc.). The sensors 115 may detect the location and/or orientation of the host vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., objects and/or characteristics of surroundings of the host vehicle 100, such as the target vehicles 200, road lane markings, traffic lights and/or signs, etc. For example, the sensors 115 may include radar sensors, ultrasonic sensors, scanning laser range finders, light detection and ranging (lidar) devices, and image processing sensors such as cameras.

The propulsion system 120 of the host vehicle 100 generates energy and translates the energy into motion of the host vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the host vehicle 100 to thereby slow and/or stop the host vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

The user interface 135 presents information to and receives information from an operator of the host vehicle 100. The user interface 135 may be located, e.g., on an instrument panel in a passenger compartment of the host vehicle 100, or wherever may be readily seen by the operator. The user interface 135 may include dials, digital readouts, screens, speakers, and so on for providing information to the operator, e.g., human-machine interface (HMI) elements such as are known. The user interface 135 may include buttons, knobs, keypads, microphone, and so on for receiving information from the operator.

Figure 2:
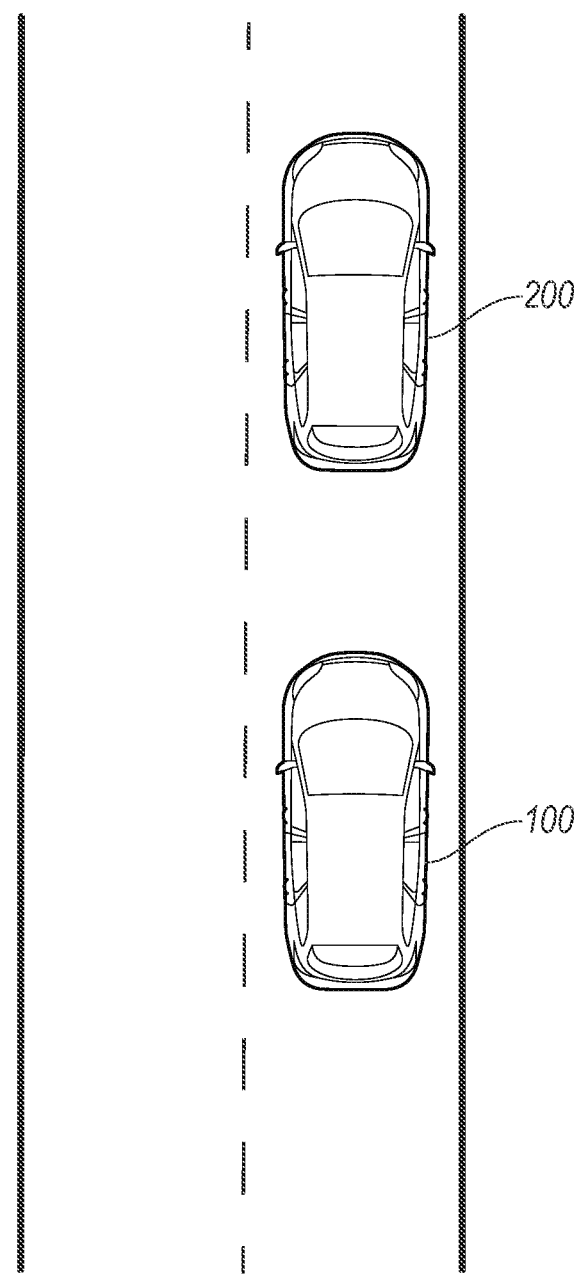
FIG. 2 is a diagrammatic top view of an example interaction between the host vehicle and a target vehicle.

With reference to FIG. 2, as the host vehicle 100 travels through an environment, the host vehicle 100 may interact with target vehicles 200, i.e., vehicles other than the host vehicle 100. The term "host vehicle" refers to the vehicle that includes the computer 105 and which the computer 105 can control. The term "target vehicle" refers to other vehicles besides the host vehicle 100, over which the computer 105 does not have control. In the example of FIG. 2, the host vehicle 100 is traveling behind the target vehicle 200 in a lane of a road.

The computer 105 may be programmed to determine the host kinematic state and the target kinematic state. For the purposes of this disclosure, a "kinematic state" is defined as a mathematical description of the position and/or motion of an entity. The kinematic states can include some combination of a position, a heading, a velocity, an acceleration, a yaw rate, etc. The velocity may include a velocity vector and/or a scalar speed. The "host kinematic state" is the kinematic state of the host vehicle 100. The computer 105 may determine the host kinematic state based on data from the sensors 115, e.g., from a GPS sensor, wheel speed sensors, IMUs, etc. The "target kinematic state" is the kinematic state of one or more of the target vehicles 200 in the environment with the host vehicle 100. The computer 105 may determine the target kinematic states based on data from the sensors 115, e.g., positions and velocities of the target vehicles 200 over time from radar, ultrasonic sensors, and/or lidar.

The techniques below refer to a nominal control input and an adjusted control input. For the purposes of this disclosure, a "control input" is defined as one or more values that control operation of a component of a vehicle. The control input thus serves as a command for the component, e.g., for at least one of the propulsion system 120, the brake system 125, or the steering system 130 of the host vehicle 100. For example, the components of the host vehicle 100 may include the propulsion system 120 and the brake system 125, and the control input may include an input acceleration of the host vehicle 100. Actuating the propulsion system 120 may include, when the input acceleration is positive, setting the throttle to the input acceleration. Actuating the brake system 125 may include, when the input acceleration is negative, engaging the brake system 125 with a brake force resulting in a negative acceleration equal to the input acceleration.

The control input may be subject to a prescribed boundary. In other words, the control input used to actuate the component is from a predetermined set of control inputs. The set of control inputs can be chosen based on the capabilities of the component of the host vehicle 100 that is controlled by the control input, e.g., the brake system 125 and/or the steering system 130. The set may be represented by the following expression:

$$u_t \in U = \{ u \in R^m : h(u) \leq 0 \}$$

in which $u_t$ is the control input at time t, U is the predetermined set of control inputs, $R^m$ is the set of vectors of length m populated by real numbers, and h is a function defining whether the argument u is within the capabilities of the component of the vehicle. The length m may be the number of distinct values in the control input, e.g., 1 for acceleration alone, 2 for acceleration and steering angle, etc. For example, for acceleration of the host vehicle 100, the set of control inputs may be a range from a minimum acceleration to a maximum acceleration, e.g., $U = [\underline{a}_{host}, \overline{a}_{host}]$, in which $\underline{a}_{host}$ is a minimum acceleration (i.e., a maximum deceleration from braking) of which the brake system 125 of the host vehicle 100 is capable, and $\overline{a}_{host}$ is a maximum acceleration of which the propulsion system 120 of the host vehicle 100 is capable.

Figure 3:
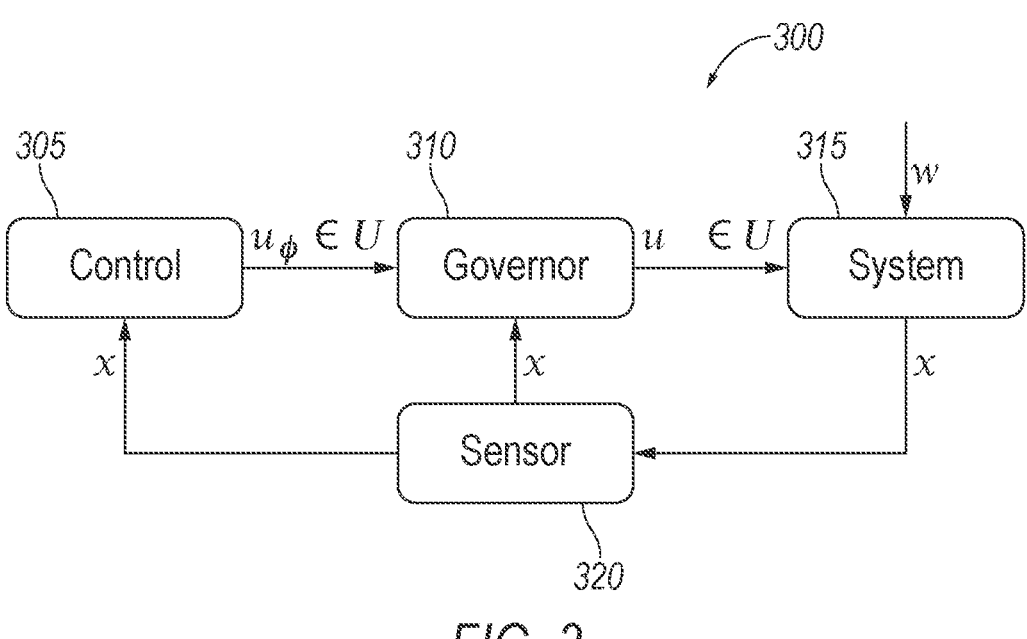
FIG. 3 is a block diagram of an example feedback loop for controlling the vehicle.

FIG. 3 is a block diagram of a feedback loop 300 for controlling the host vehicle 100. The memory of the computer 105 stores executable instructions for performing the blocks of the feedback loop 300 and/or programming can be implemented in structures such as mentioned above. The feedback loop 300 may iterate once per timestep. As a general overview, a control block 305 receives the host and target kinematic states as measured by the sensors 115. The control block 305 outputs a nominal control input. A governor block 310 receives the nominal control input and the host and target kinematic states. The governor block 310 outputs the adjusted control input. A system block 315 actuates the host vehicle 100 according to the adjusted control input, resulting in the actual host and target kinematic states for the next timestep. A sensor block 320 determines the host and target kinematic states based on measurements of the environment by the sensors 115.

In the control block 305, the computer 105 may be programmed to determine the nominal control input $u_{\varphi}$, e.g., based on the host kinematic state and the target kinematic state (represented collectively as a system state x). The control block 305 receives the host kinematic state and target kinematic state from the sensor block 320. The computer 105 may determine the nominal control input $u_{\varphi}$ using an algorithm for controlling the host vehicle 100 such as reference governor (RG), control barrier function (CBF), model predictive control (MPC), action governor (AG), or responsibility sensitive safety model (RSS), as are known. Alternatively or additionally, the computer 105 may receive the nominal control input $u_{\varphi}$ from the operator of the host vehicle, e.g., via the accelerator pedal for the propulsion system 120, the brake pedal for the brake system 125, and/or the steering wheel for the steering system 130. For example, the computer 105 may determine the nominal control input $u_{\varphi}$ using one of the ADAS features or algorithm for controlling the host vehicle when that ADAS feature or algorithm is actively controlling the host vehicle 100 and may receive the nominal control input $u_{\varphi}$ from the operator otherwise.

In the governor block 310, the computer 105 is programmed to determine the adjusted control input u for the component based on the nominal control input $u_{\varphi}$, the host kinematic state, and the target kinematic state, as will be described in more detail below with respect to FIG. 4. The governor block 310 receives the nominal control input $u_\varphi$ from the control block 305 and the host and target kinematic states x from the sensor block 320.

In the system block 315, the computer 105 actuates the component of the vehicle according to the adjusted control input u. The "output" of the system block 315 is the actual host and target kinematic states resulting from the actuation of the host vehicle 100 and from a disturbance input w. The disturbance input w represents unmeasured factors that may affect the host and target kinematic states x, e.g., actions by the target vehicle 200.

In the sensor block 320, the computer 105 may receive data from the sensors 115 measuring the effects on the world from the system block 315. The computer 105 may determine the host and target kinematic states x from the data from the sensors 115, for use by the control block 305 and the governor block 310 in the next timestep.

The computer 105 may be programmed to determine possible host kinematic states at each timestep using a system dynamics model taking as inputs the control input, host kinematic state, and target kinematic state at the immediately previous timestep. The system dynamics model may determine the host and target kinematic states $x_{t+1}$ at timestep t+1 based on, e.g., as a function of, the host and target kinematic states $x_t$, the control input $u_t$, and the disturbance input $w_t$ at the immediately previous timestep t, as in the following expression:

$$x_{t+1} = f(x_t, u_t, w_t)$$

The system dynamics model may be a physics-based kinematic model, as is known. The specific system dynamics model may be chosen based on, e.g., the ADAS feature being controlled.

For example, in the context of an adaptive cruise control, the system dynamics model may be a discrete-time dynamical model in one spatial dimension of the change in relative distance between the host vehicle 100 and the target vehicle 200 and of the change in relative velocity between the host vehicle 100 and the target vehicle 200, as in the following expressions:

$$\Delta s(t+1) = \Delta s(t) + T_s \Delta v(t) + \frac{T_s^2}{2} a_{host}(t) - \frac{T_s^2}{2} a_{target}(t)$$

$$\Delta v(t+1) = \Delta v(t) + T_s a_{host}(t) - T_s a_{target}(t)$$

in which $\Delta s$ is the longitudinal distance between the host vehicle 100 and the target vehicle 200, $\Delta v$ is the difference in velocity between the host vehicle 100 and the target vehicle 200, $T_s$ is the duration of a timestep, $a_{host}$ is the acceleration of the host vehicle 100, and $a_{target}$ is the acceleration of the target vehicle 200. In this example, the control input u is the host acceleration $a_{host}$, and the disturbance input w is the target acceleration $a_{target}$.

Figure 4:
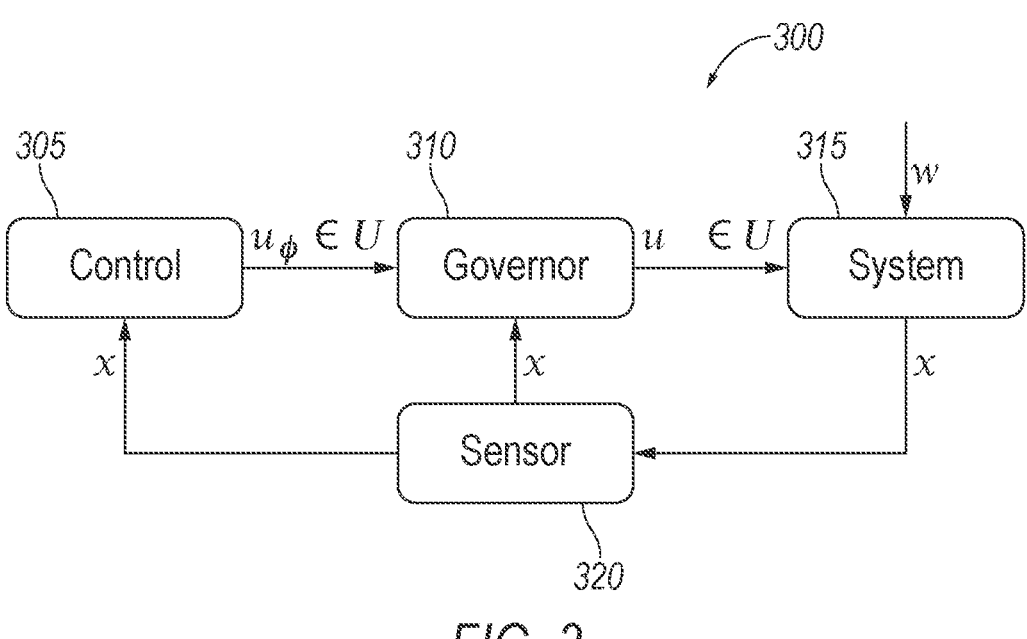
FIG. 4 is a diagram of example sets of states of the host vehicle satisfying a constraint for different numbers of timesteps.

With reference to FIG. 4, the determination of the adjusted control input uses a constraint on the host kinematic state and target kinematic state. The constraint may be represented as an initial set 400 $X_0$ of possible host and target kinematic states $x_t$ at a particular timestep t. FIG. 4 represents two dimensions of the host and target kinematic states x, but the host and target kinematic states x may have more dimensions. The constraint may be chosen to ensure a buffer between the host vehicle 100 and the target vehicle 200 at the current timestep t in a manner suitable for the component of the host vehicle 100 that is being controlled, e.g., for the type of ADAS feature being implemented. For example, in the context of an adaptive cruise control, the constraint may be that the longitudinal distance between the host vehicle 100 and the target vehicle 200 is greater than a predetermined distance, without an upper bound on the distance and without bounds on the relative velocity, e.g., the initial set 400 $X_0$ in the following expression:

$$X_0 = \left\{ \begin{bmatrix} \Delta s \\ \Delta v \end{bmatrix} \in \mathbb{R}^2 : \begin{bmatrix} 1 & 0 \\ -1 & 0 \\ 0 & 1 \\ 0 & -1 \end{bmatrix} \begin{bmatrix} \Delta s \\ \Delta v \end{bmatrix} \leq \begin{bmatrix} -10 \\ M \\ M \\ M \end{bmatrix} \right\}$$

in which M is an arbitrarily large number chosen to make the maximum value of $\Delta s$ and the minimum and maximum values of $\Delta v$ effectively unbounded. For other ADAS features, headings, yaw rates, etc. of the host vehicle 100 and the target vehicle 200 may be included in the definition of the constraint.

The computer 105 is programmed to determine the adjusted control input for the component based on the nominal control input, the host kinematic state, and the target kinematic state, such that the adjusted control input maximizes a number of timesteps for which the constraint on the host kinematic state and target kinematic state is satisfiable. The adjusted control input may maximize the number of timesteps for which the constraint on the host kinematic state and target kinematic state is satisfiable across a range of target kinematic states. In other words, if the host vehicle 100 is actuated according to the adjusted control input, then at each timestep before the maximum number, a control input exists that results in a host kinematic state that, combined with any target kinematic state in the range, satisfies the constraint. At a given timestep t less than the maximum number, the computer 105 executes the system dynamics model to determine a prediction $x_{t+1}$ for the adjusted control input $u_t$, the current host and target kinematic state $x_t$, and any disturbance input w to the target kinematic state within a range Wis a host and target kinematic state $x_{t+1}$, and the prediction $x_{t+1}$ is a member of the initial set 400 $X_0$, as in the following expression:

$$x_{t+1} = f(x_t, u_t, w) \in X_0, \forall w \in W$$

In other words, host and target kinematic state $x_{t+1}$ is an element of the set of predictions of the system dynamics model for the adjusted control input $u_t$ and the current host and target kinematic state $x_t$, for the range W of disturbances to the target kinematic state that is a subset of the initial set 400 $X_0$, as in the following shorthand expression:

$$x_{t+1} \in f(x_t, u_t, W) \subset X_0$$

The range W may be a predetermined range and may be stored in the memory of the computer 105. The range W may be chosen to encompass most behavior by the target vehicle 200.

As an overview of determining the adjusted control input, the computer 105 may attempt to determine a first adjusted control input that minimizes an objective function of the host vehicle 100 and for which the constraint is satisfiable for an indefinite number of timesteps. The constraint being satisfiable for an indefinite number of timesteps may be represented by an indefinite-timestep set 405 $X_\infty$ consisting of possible host and target kinematic states x for which the constraint is satisfied at a current timestep and permit the constraint to be satisfied for an indefinite number of timesteps. As shown in FIG. 4, the indefinite-timestep set 405 $X_\infty$ is a subset of the initial set 400 $X_0$. If the computer 105 identifies such a first adjusted control input, then the first adjusted control input is used as the adjusted control input. In response to the computer 105 being unable to determine the first adjusted control input (e.g., the indefinite-timestep set 405 $X_\infty$ being empty, the determination of the first adjusted control input described below being infeasible, etc.), the computer 105 determines a second adjusted control input that maximizes a finite number of timesteps for which the constraint is satisfiable. To do so, the computer 105 recursively determines for each timestep a set of possible host kinematic states at that timestep for which the constraint is satisfied at that timestep. Each set of possible host kinematic states at one timestep is a subset of a set of possible host kinematic states at an immediately previous timestep. In the example of FIG. 4, a first set 410 $X_1$ consists of members for which the constraint is satisfiable for at least one timestep, a second set 415 $X_2$ consists of members for which the constraint is satisfiable for at least two timesteps, and a third set 420 $X_3$ consists of members for which the constraint is satisfiable for at least three timesteps, and so on. Each set is a subset of the set for the immediately previous timestep, e.g., $X_3 \subseteq X_2 \subseteq X_1 \subseteq X_0$, as illustrated in FIG. 4. The recursion continues until a timestep k*+1 for which the set of possible host kinematic states is empty, and the second adjusted control input is what results in the last nonempty set, for the timestep k*. The second adjusted control input is used as the adjusted control input.

To begin the determination of the adjusted control input, the computer 105 may determine whether the first adjusted control input exists for which the constraint is satisfiable for an indefinite number of timesteps, i.e., a value for $u_t$ exists that satisfies the following expression:

$$x_{t+1} = f(x_t, u_t, w) \in X_\infty, \forall w \in W$$

For example, the computer 105 may execute the control block 305 and determine whether the nominal control input satisfies an internal constraint of the algorithm for controlling the host vehicle 100. For example, the computer 105 may determine whether the target vehicle 200 is outside of a virtual boundary defined by a control barrier function (CBF), as is known. In that case, the computer 105 sets the first adjusted control input to the nominal control input. The computer 105 may determine whether the first adjusted control input exists for which the host kinematic state is in a set of host kinematic states satisfying the constraint. The set may be defined by the internal constraint of the algorithm used in the control block 305. The set may be a control invariant set, e.g., a robust control invariant set. As is known in the field of control theory, a set is robust control invariant if there exists a feedback that maps states of the system to admissible control inputs so that every trajectory from an initial state in the set that follows the feedback remains in the set for all time. In this case, the set is the indefinite-timestep set 405 $X_\infty$, and the state of the system is the host and target kinematic states x. Certain algorithms for controlling the host vehicle 100 are proven to have robust control invariant sets when their internal constraints are satisfied, e.g., control barrier function (CBF), robust model predictive control (RMPC), reference governor (RG), etc.

If at least one first adjusted control input exists, the computer 105 may determine the first adjusted control input that minimizes an objective function describing the host vehicle 100. The objective function may take as inputs the control input u and components of the host kinematic state. For example, the computer 105 may optimize the first adjusted control input to provide the minimum value for the objective function resulting in a host kinematic state that, for all the target kinematic states in the range, is in the indefinite-timestep set 405, as in the following expression:

$$u_{t,\infty} = \underset{u \in U}{\operatorname{argmin}} J_t(u) \text{ s.t. } f(x_t, u, W) \subset X_\infty$$

in which $u_{t,\infty}$ is the first adjusted control input at the timestep t, "argmin" returns the argument of a function that minimizes the value of that function, $J_t$ is the objective function at the timestep t, and "s.t." stands for "such that." The first adjusted control input $u_{t,\infty}$ is limited to the predetermined set U of control inputs available to the component. The first adjusted control input that minimizes the objective function of the host vehicle 100 may be determined as part of the algorithm for controlling the host vehicle 100 from the control block 305.

The computer 105 may be programmed to, in response to the first adjusted control input not existing, determine the second adjusted control input. The second adjusted control input maximizes a finite number of timesteps for which the constraint on the host kinematic state and target kinematic state is satisfiable; e.g., the second adjusted control input results in a host kinematic state that, for all the target kinematic states in the range W, is in the kth set $X_k$ of possible host and target kinematic states satisfying the constraint for the largest number k of timesteps. The computer 105 may determine the second adjusted control input such that the predictions of the system dynamics model for the current host and target kinematic state xx and the second adjusted control input $u_{t,k}$ for all the target kinematic states in the range W is a subset of the kth set $X_k$ of possible host and target kinematic states satisfying the constraint for the largest number k of timesteps, as in the following expression:

$$u_{t,k} \in U \text{ s.t. } f(x_t, u_{t,k}, W) \subset \tilde{X}_k$$

in which $\tilde{X}_k$ is a nonstrict subset of the kth set $\tilde{X}_k$, i.e., $\tilde{X}_k \in X_k$, which is constructed as described below. The second adjusted control input $u_{t,k}$ is limited to the predetermined set U of control inputs available to the component.

The computer 105 is programmed to recursively determine for each timestep k a set $\tilde{X}_k$ of possible host kinematic states x at that timestep k for which the constraint is satisfied at that timestep k. The set $\tilde{X}_k$ of possible host kinematic states at the timestep k is a subset of a set $\tilde{X}_{k-1}$ of possible host kinematic states at an immediately previous timestep k−1. The computer 105 thus determines the set $\tilde{X}_k$ of possible host kinematic states at each timestep k such that a possible control input u exists for which the set $\tilde{X}_k$ of possible host kinematic states at the timestep k is a subset of the set $\tilde{X}_{k-1}$ of possible host kinematic states at the immediately previous timestep k−1. For example, the set $\tilde{X}_k$ may equal the intersection of the initial set 400 $X_0$ and the set of values for the host and target kinematic states x for which a control input u exists such that the predictions of the system dynamics model of x and u for the predetermined range of target kinematic state changes W is a subset of the set $\tilde{X}_{k-1}$, e.g., as given in the following expression:

$$\tilde{X}_k = X_0 \cap \left\{ x \in \mathbb{R}^n \colon \exists\, u \in U \text{ s.t. } f(x, u, W) \subset \tilde{X}_{k-1} \right\}$$

The determination of the set $\tilde{X}_k$ is recursive because the determination depends on the previous determination of the set $\tilde{X}_{k-1}$. The computer 105 may perform the recursive determination of the set $\tilde{X}_k$ of possible host kinematic states until a timestep k*+1 at which the set $\tilde{X}_{k*+1}$ of possible host kinematic states is empty. The second adjusted control input $u_{t,k*}$ is taken from the control inputs u leading to the final nonempty set $\tilde{X}_{k*}$, and is used as the adjusted control input $u_t$. The computer 105 outputs the number k* of timesteps for which the constraint is satisfied, i.e., the index of the final nonempty set $\tilde{X}_{k*}$.

The computer 105 is programmed to actuate the component according to the adjusted control input $u_t$. Consistent with the foregoing description, the computer 105 may actuate the component according to the first adjusted control input $u_{t,\infty}$ in response to the first adjusted control input $u_{t,\infty}$ existing, and actuate the component according to the second adjusted control input $u_{t,k*}$ in response to the first adjusted control input $u_{t,\infty}$ not existing. For example, the computer 105 may actuate the propulsion system 120 and the brake system 125 according to an input acceleration of the adjusted control input $u_t$, as described above. Alternatively or additionally, the computer 105 may actuate the user interface 135 to output a message, e.g., recommending the adjusted control input $u_t$ and/or stating the finite number k* of timesteps for which the constraint is satisfiable.

Figure 5:
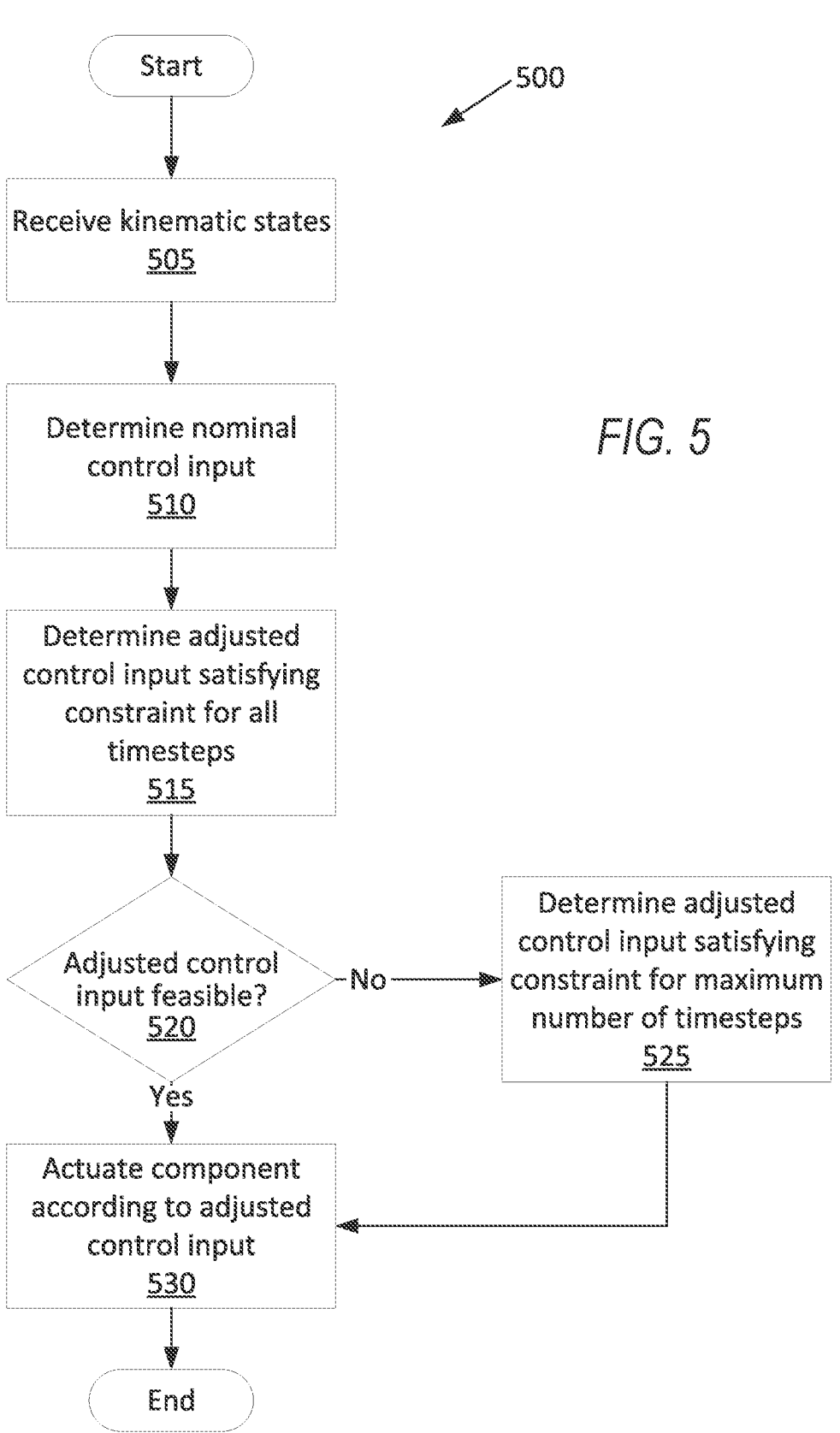
FIG. 5 is a flowchart of an example process for controlling the host vehicle.

FIG. 5 is a flowchart illustrating an example process 500 for controlling the host vehicle 100. The memory of the computer 105 stores executable instructions for performing the steps of the process 500 and/or programming can be implemented in structures such as mentioned above. The process 500 may be performed repeatedly while the host vehicle 100 is on, e.g., once per timestep. As a general overview of the process 500, the computer 105 receives the host and target kinematic states, determines the nominal control input, determines the first adjusted control input, determines the second adjusted control input in response to being unable to determine the first adjusted control input, and actuates the component according to the first or second adjusted control input.

The process 500 begins in a block 505, in which the computer 105 receives the host and target kinematic states $x_t$ for the current timestep t, as described above.

Next, in a block 510, the computer 105 determines the nominal control input $u_\varphi$, as described above.

Next, in a block 515, the computer 105 determines the first adjusted control input $u_{,\infty}$, as described above.

Next, in a decision block 520, the computer 105 determines whether the computer 105 was able to determine the first adjusted control input $u_{t,\infty}$ in the block 515, as described above. In response to being unable to determine the first adjusted control input $u_{t,\infty}$, the process 500 proceeds to a block 525. In response to determining the first adjusted control input $u_{t,\infty}$, the computer 105 uses the first adjusted control input $u_{t,\infty}$ existing as the adjusted control input $u_t$, and the process 500 proceeds to a block 530.

In the block 525, the computer 105 determines the second adjusted control input $u_{t,k*}$, which is used as the adjusted control input $u_t$, as described above. After the block 525, the process 500 proceeds to the block 530.

In the block 530, the computer 105 actuates the component, e.g., to control or operate the host vehicle 100, according to the adjusted control input $u_t$, as described above. After the block 530, the process 500 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS gener- ally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated there- with (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative man- ner, and it is to be understood that the terminology which has been used is intended to be in the nature of words of description rather than of limitation. The adjectives "first," "second," etc. are used throughout this document as identi- fiers and are not intended to signify importance, order, or quantity. Use of "in response to," "upon determining," etc. indicates a causal relationship, not merely a temporal rela- tionship. Many modifications and variations of the present disclosure are possible in light of the above teachings, and the disclosure may be practiced otherwise than as specifi- cally described.

What is claimed is:

1. A computer comprising a processor and a memory, the memory storing instructions executable by the processor to:
   determine whether a first adjusted control input for a component of a host vehicle exists for which a con- straint on a host kinematic state of the host vehicle and a target kinematic state of at least one target vehicle is satisfiable for an indefinite number of timesteps;
   in response to the first adjusted control input not existing, determine a second adjusted control input for the component of the host vehicle that maximizes a number of timesteps for which the constraint is satisfiable, the determination of the second adjusted control input being based on a nominal control input, the host kinematic state, and the target kinematic state; and
   actuate the component according to the second adjusted control input.

2. The computer of claim 1, wherein the instructions further include instructions to output the number of timesteps for which the constraint is satisfied.

3. The computer of claim 1, wherein the instructions further include instructions to recursively determine for each timestep a set of possible host kinematic states at that timestep for which the constraint is satisfied at that timestep, the set of possible host kinematic states at the timestep being a subset of a set of possible host kinematic states at an immediately previous timestep.

4. The computer of claim 3, wherein the instructions further include instructions to perform the recursive deter- mination of the set of possible host kinematic states until a timestep at which the set of possible host kinematic states is empty.

5. The computer of claim 3, wherein the instructions further include instructions to determine the set of possible host kinematic states at each timestep such that a possible control input exists for which the set of possible host kinematic states at the timestep is a subset of the set of possible host kinematic states at the immediately previous timestep.

6. The computer of claim 3, wherein the instructions further include instructions to determine the possible host kinematic states at each timestep using a system dynamics model taking as inputs the second adjusted control input, host kinematic state, and target kinematic state at the imme- diately previous timestep.

7. The computer of claim 1, wherein the instructions further include instructions to actuate the component accord- ing to the first adjusted control input in response to the first adjusted control input existing, and actuate the component according to the second adjusted control input in response to the first adjusted control input not existing.

8. The computer of claim 1, wherein the instructions further include instructions to determine the first adjusted control input that minimizes an objective function of the host vehicle.

9. The computer of claim 1, wherein the instructions further include instructions to set the first adjusted control input to the nominal control input in response to the con- straint being satisfiable for an indefinite number of timesteps by the nominal control input.

10. The computer of claim 1, wherein the instructions further include instructions to determine whether the first adjusted control input exists for which the host kinematic state is in a set of host kinematic states satisfying the constraint, and the set of host kinematic states is a control invariant set.

11. The computer of claim 1, wherein the instructions further include instructions to determine the second adjusted control input that maximizes the number of timesteps for which the constraint on the host kinematic state and target kinematic state is satisfiable across a range of target kine- matic states.

12. The computer of claim 11, wherein the range is a predetermined range.

13. The computer of claim 11, wherein the instructions further include instructions to determine possible host kine- matic states at each timestep using a system dynamics model taking as inputs a control input at the immediately previous timestep, the host kinematic state at the immediately previ- ous timestep, and the range of target kinematic states.

14. The computer of claim 1, wherein the second adjusted control input is a command for at least one of a propulsion system, brake system, or steering system of the host vehicle.

15. The computer of claim 1, wherein the instructions further include instructions to determine the nominal control input based on the host kinematic state and the target kinematic state.

16. The computer of claim 1, wherein the instructions further include instructions to receive the nominal control input from an operator of the host vehicle.

17. The computer of claim 1, wherein the host kinematic state includes a velocity of the host vehicle.

18. The computer of claim 1, wherein the target kinematic state includes at least one velocity of the at least one target vehicle.

19. A method comprising:

determining whether a first adjusted control input for a component of a host vehicle exists for which a constraint on a host kinematic state of the host vehicle and a target kinematic state of at least one target vehicle is satisfiable for an indefinite number of timesteps;

in response to the first adjusted control input not existing, determining a second adjusted control input for the component of the host vehicle that maximizes a number of timesteps for which the constraint is satisfiable, the determination of the second adjusted control input being based on a nominal control input, the host kinematic state, and the target kinematic state; and actuating the component according to the second adjusted control input.

20. A computer comprising a processor and a memory, the memory storing instructions executable by the processor to:

determine an adjusted control input for a component of a host vehicle that maximizes a number of timesteps for which a constraint on a host kinematic state of the host vehicle and a target kinematic state of at least one target vehicle is satisfiable across a range of target kinematic states, the determination of the adjusted control input being based on a nominal control input, the host kinematic state, and the target kinematic state; and actuate the component according to the adjusted control input.

* * * * *